United States Patent
Huetter

(12) 
(10) Patent No.: US 8,359,446 B2
(45) Date of Patent: Jan. 22, 2013

(54) METHOD FOR PROCESSING DATA USING TRIPLE BUFFERING

(75) Inventor: Ingo Huetter, Pattensen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 667 days.

(21) Appl. No.: 12/590,484

(22) Filed: Nov. 9, 2009

(65) Prior Publication Data

US 2010/0122045 A1 May 13, 2010

(30) Foreign Application Priority Data

Nov. 11, 2008 (EP) .................................. 08305796

(51) Int. Cl.
 *G06F 12/00* (2006.01)
(52) U.S. Cl. ......... 711/167; 711/151; 711/154; 711/158
(58) Field of Classification Search .................. 711/167, 711/151, 154, 158
See application file for complete search history.

(56) References Cited

U.S. PATENT DOCUMENTS

| | | | | |
|---|---|---|---|---|
| 5,651,136 A | * | 7/1997 | Denton et al. | 711/118 |
| 5,835,953 A | * | 11/1998 | Ohran | 711/162 |
| 6,327,305 B1 | * | 12/2001 | Porter et al. | 375/240.13 |
| 6,418,478 B1 | | 7/2002 | Ignatius et al. | |
| 6,519,286 B1 | * | 2/2003 | Porter et al. | 375/240.13 |
| 7,453,760 B2 | * | 11/2008 | Lee | 365/230.05 |
| 7,577,894 B2 | * | 8/2009 | Takeda et al. | 714/758 |
| 7,779,212 B2 | * | 8/2010 | Meyer et al. | 711/154 |
| 2003/0028720 A1 | * | 2/2003 | Lam et al. | 711/112 |
| 2008/0143733 A1 | | 6/2008 | Brothers | |
| 2009/0157957 A1 | * | 6/2009 | Fontijn | 711/113 |

FOREIGN PATENT DOCUMENTS

EP      1 262 939 A      12/2002

* cited by examiner

*Primary Examiner* — Stephen Elmore
(74) *Attorney, Agent, or Firm* — Myers Wolin, LLC

(57) ABSTRACT

In a method for processing data using triple buffering, a data block to be processed is written to a memory area in a first interval of time. The data block is processed in the same memory area (A, B, C) in a second interval of time. The processed data block is returned from the same memory area in a third interval of time.

16 Claims, 3 Drawing Sheets

METHOD FOR PROCESSING DATA USING TRIPLE BUFFERING

FIELD OF THE INVENTION

The present invention relates to a method for processing data using triple buffering, in particular for processing data from a first data processing system in a second data processing system.

BACKGROUND OF THE INVENTION

A known principle in data processing is the practice of keeping special hardware ready which performs particular data operations, for example mathematical operations. This is used to relieve the load on the central processing unit (CPU). The requirement to have to interchange data between different units often arises in this connection. Data are typically transported from a first system to a second system, are processed there and are then transported back again from the second system to the first system. Special configurations of the systems determine the manner in which the data are transported. The data can be transported, for example, using a network or by means of direct memory access (DMA).

In order to be able to achieve a data processing speed which is as high as possible, the transport of data is organized in such a manner that it takes place in the background while the previously transmitted data are being processed. For this purpose, two memory areas are kept ready in the second system, the target system. While the data in one of the two memory areas are being processed, the next data to be processed are written to the other memory area.

These data are available for processing as soon as the processing of the data in the other memory area has been concluded. Since data are always available for processing, efficient use can be made of the processing means. In theory, pauses in which the processing means cannot operate because it has to wait for data do not arise. This presupposes, inter alia, that the data transmission medium has a sufficiently wide bandwidth. Such a method is known to a person skilled in art under the name double buffering.

IBM, CELL BROADBAND ENGINE—Programming Tutorial—Version 3.0 shows a double buffering method (see, for example, page 5 and page 87). The method describes the transport of data in one direction from the first system to the target system. It is necessary to implement a second double buffering method in order to transport the data which have already been processed back from the target system to the first system.

FIG. 1 shows an arrangement of memory areas for implementing a double buffering method in the target system 1, which allows bidirectional transport of data. For this purpose, four memory areas A, B, C, D of the same size are kept available in the target system 1. Two first memory areas A, B form the input buffer and implement a double buffering method for the input data stream. Two second memory areas C, D form the output buffer and implement a double buffering method for the data which have already been processed, the output data stream. In a first interval of time t1, data are received in a first memory area A of the input buffer A, B. This is symbolically indicated by a wedge which shows the filling of the memory area A over the interval of time t1. At the beginning of the interval of time t1, this memory area is empty and, towards the end of the interval of time t1, this memory area is filled with data. The data which have already been previously received in a second memory area B of the input buffer A, B are kept available in this second memory area B in the interval of time t1 for data processing. These data are processed by the target system 1 and the result data are stored in a second memory area D of the output buffer C, D in this first interval of time t1. At the end of the first interval of time t1, the result data is available in the second memory area D of the output buffer C, D. The memory areas B and D which are kept available for data processing in an interval of time t1 are each graphically illustrated using hatching. The emptying of the memory area C during the interval of time t1 is likewise symbolically illustrated by a wedge. At the beginning of the interval of time t1, this memory area is filled with data to be returned (result data from the processing by the target system 1 at a time interval before the interval t1) and, towards the end of the interval of time t1, the data from the memory area C have been returned. The illustrations which indicate the emptying and filling of the memory areas are graphically inverted (i.e., the black area in A corresponds to the white area in C, and the white area in A corresponds to the black area in C). In a second interval of time t2, the processed data from the second memory area D of the output buffer C, D are returned to the first data processing system not shown here. The first memory area C of the output buffer C, D is now available to receive the data processed in the second interval of time t2. In the second interval of time t2, the data which were received in a first memory area A in the first interval of time t1 and are awaiting processing are kept available in this memory area A in the input buffer A, B. The data from the input data stream are received in the second memory area B of the input buffer A, B in the second interval of time t2. In this method, a memory area for receiving data and a memory area containing data to be processed are thus respectively available in the input buffer A, B in each interval of time. A memory area for returning the data which have already been processed and a memory area for processing the data are respectively available in the output buffer C, D in each interval of time. In other words, in one interval of time, buffer A is for receiving data and buffer B is for containing data to be processed, and in the next interval of time, buffer B is for receiving data and buffer A is for containing data to be processed. Similarly, in one interval of time, buffer C is for returning data which have already been processed and buffer D is for processing the data, and in the next interval of time, buffer D is for receiving data which have already been processed and buffer C is for processing the data.

SUMMARY OF THE INVENTION

The invention provides for a method for processing data to carry out the following steps: a data block to be processed is written to a memory area in a first interval of time. The data block is processed in the same memory area in a second interval of time. Data to be processed are read from there and the processed data are also written to the same memory area. The data block which has now been processed is transferred from the same memory area in a third interval of time. This memory area is then available again to receive data in the next interval of time. This has the advantage that only the same number of memory areas are respectively needed to receive, process and transfer the data. In contrast, in the case of a double buffering method, twice as many memory areas are provided for processing the data as are provided for receiving and transferring the data. The data need not be shifted from one memory area to another during the processing step. Overall, in comparison with the double buffering method, the method according to the invention allows the same utilization of the processing means whilst simultaneously reducing the number of memory areas needed for this purpose.

The invention provides for three memory areas in the memory to be grouped to form a group of memory areas. The available memory is thus clearly structured and, if required, is used for the method for processing data.

In a method for processing data, the invention provides for one or more groups of memory areas to be used for the method. One memory area in a group of memory areas is respectively used to receive, process and send data in each interval of time. As a result of the fact that one or more groups of memory areas are used to transmit and process data, the method is flexible and can be adapted for the respective tasks with respect to the available and required memory. The method is universal. The practice of respectively using one memory area in each group of memory areas to receive, process and transfer data has the advantage that the number of memory areas required is reduced since only one data block is respectively provided in a group of memory areas in each interval of time for keeping data available. Such a structure nevertheless enables bidirectional data interchange.

The method according to the invention is advantageously used in image processing. Large volumes of data are transmitted during image processing, in particular during the real-time processing of high-resolution video images. This use imposes high demands on the memory requirement and the computing power of the processing means. The reduction in the waiting time or the reduction in the memory requirement of the processing means has a particularly advantageous effect in this use.

In a method for processing data, the invention provides for an algorithm which does not have to randomly access data which have already been previously processed to be used during the step of processing a data block. With such an algorithm, there is thus no need to keep available a respective memory area for the output data and the result, that is to say data which have already been used in the algorithm can be overwritten with the result data in the memory. If the algorithm requires deterministic access to individual data which have previously been processed (for example in the case of a digital horizontal filter), these values may be buffered and are therefore still available to the algorithm despite the original data having been overwritten.

In a method for processing data from a first data processing system in a second data processing system, the invention provides for data to be written to a memory area of the second data processing system in a first interval of time. The data are processed in the same memory area of the second data processing system in a second interval of time. The data are returned to the first data processing system from this memory area of the second data processing system in a third interval of time. The use of the method according to the invention to process data in a second data processing system, with the data coming from a first data processing system and the result data being returned to the latter again, uses the advantage of the proposed method and enables bidirectional data communication between the first data processing system and the second data processing system with a reduced memory requirement in the second data processing system.

In a method for processing data, the invention provides for the second data processing system to be a subsystem of the first data processing system. Data are frequently interchanged between a main system and a subsystem. It is therefore a particular requirement in this case for the best possible use to be made of the subsystem with the lowest possible memory requirements.

In a method for processing data, the invention provides for the first data processing system to be a central processing unit and for the second data processing system to be a coprocessor. In the IBM, CELL BROADBAND ENGINE—Programming Tutorial—Version 3.0, (page 5), the central processing unit corresponds to a PowerPC processor element (PPE) and the coprocessor corresponds to a synergistic processor element (SPE).

The invention provides for the method for processing data to be implemented in a plurality of coprocessors which are all assigned to the same central processing unit.

Furthermore, the invention relates to the use of a memory, which is known per se, for carrying out a method according to the invention.

Furthermore, the invention relates to a data processing system which carries out a method according to the invention or contains a memory according to the invention.

Advantages of the invention can also be gathered from the following description of an exemplary embodiment. It goes without saying that combinations other than those explicitly stated and modifications within the scope of the practice of a person skilled in the art are also likewise within the scope of the invention.

DETAILED DESCRIPTION OF THE PREFERRED EMBODIMENTS

Figure 1:
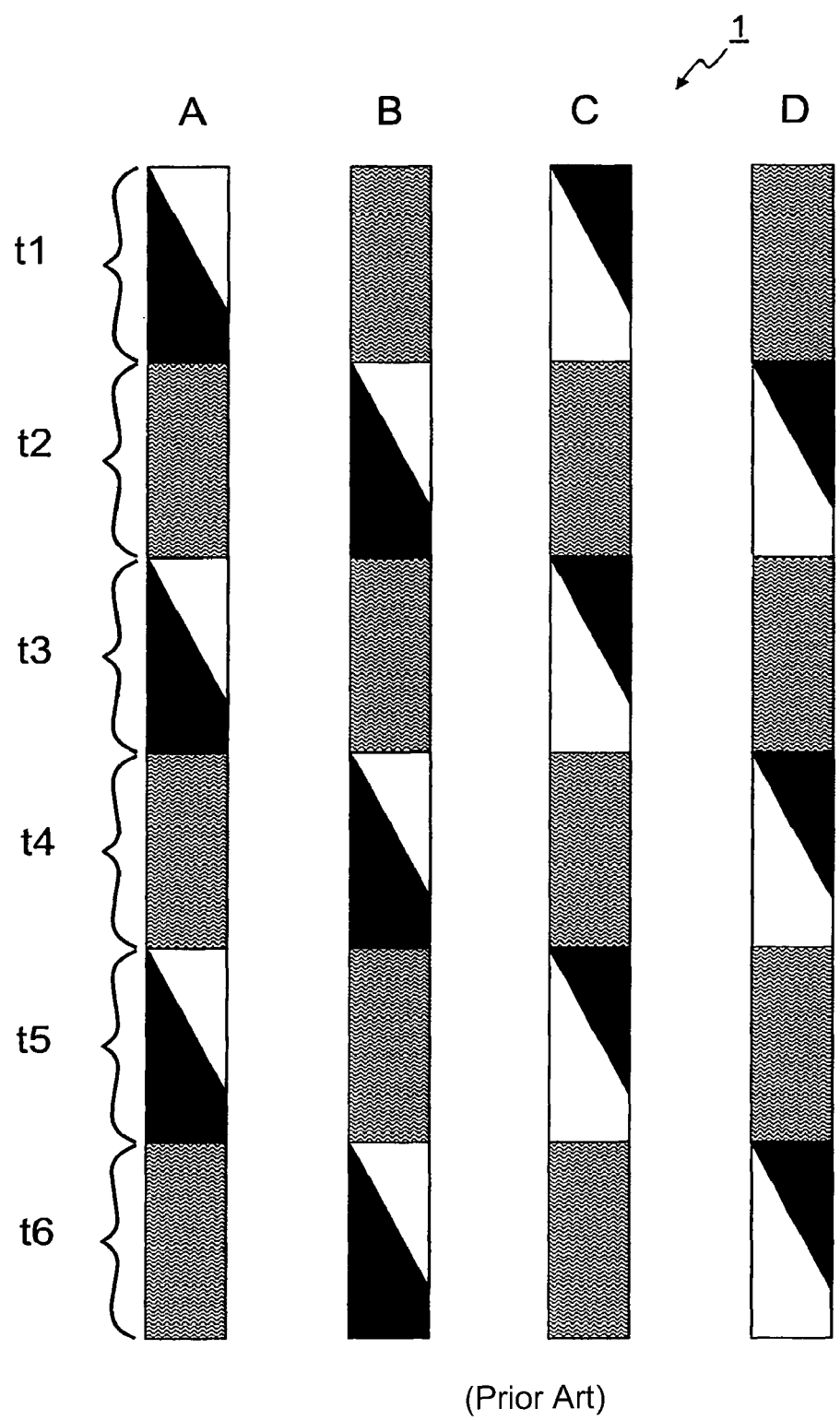
FIG. 1 shows a known method for bidirectional data interchange and its memory requirement in the subsystem.
Figure 2:
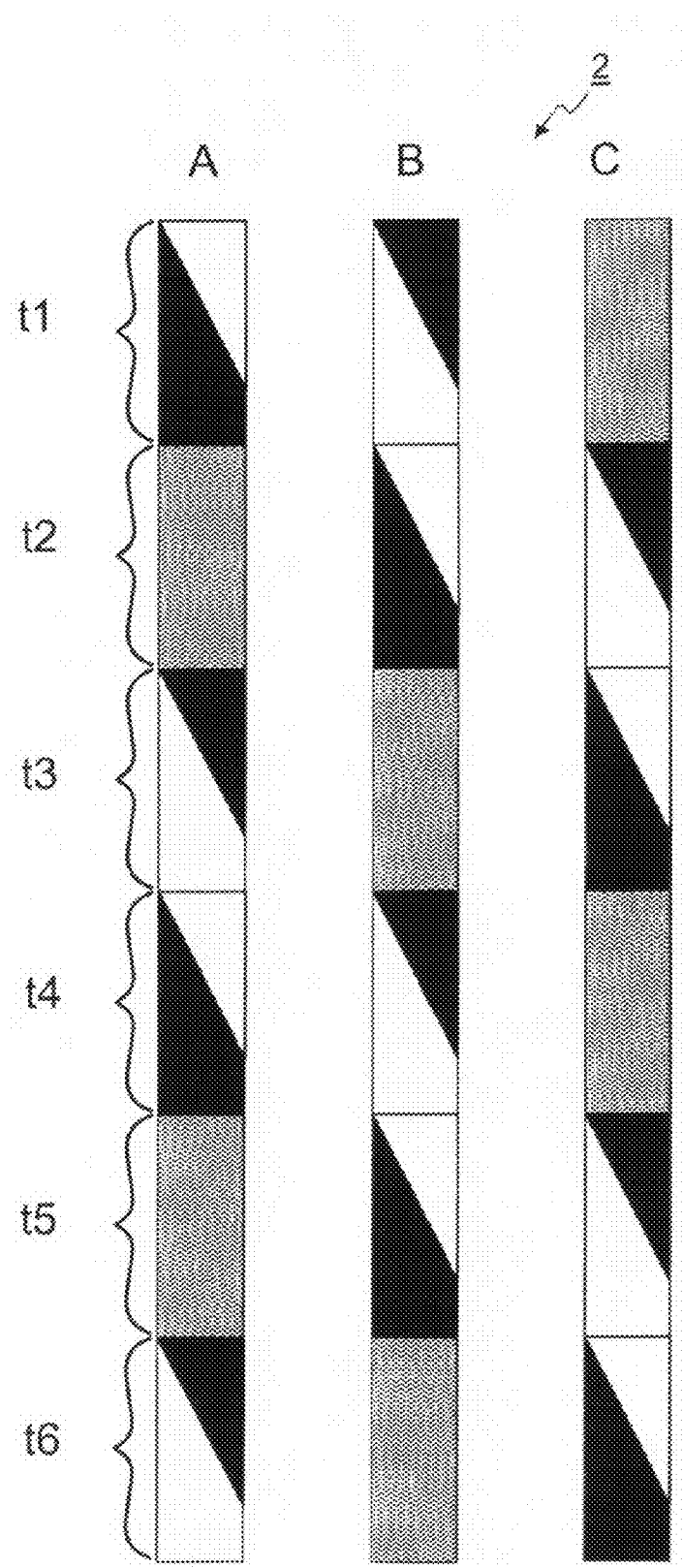
FIG. 2 shows the method according to the invention for bidirectional data interchange and its reduced memory requirement in the subsystem.

FIG. 2 shows an arrangement of memory areas for implementing the method according to the invention for bidirectional data interchange between a first data processing system and a target system 2 by means of triple buffering in the target system 2. For this purpose, three memory areas A, B, C are kept available in the target system 2. The functional use of each memory area A, B, C changes for each interval of time t1, t2, . . . , t5, t6. It is graphically illustrated, for each interval of time whose length typically results from the period needed to process the data, how the memory areas are used in the respective interval of time t1, t2, . . . , t5, t6. Data are received in the first memory area A in the first interval of time t1. These data are processed in the first memory area A in the second interval of time t2. The data are returned to the first data processing system from the first memory area A in the third interval of time t3. The same rotation of the tasks which are carried out with the aid of the memory areas B, C takes place in the two other memory areas B, C. This rotation takes place with an offset of one interval of time, with the result that precisely one memory area A, B, C is kept available to receive data, to process the data and to return the data in each interval of time t1, t2, . . . , t5, t6.

If a plurality of groups of three respective memory areas are used, rotation takes place in an analogous manner. The same number of memory areas are then also always available to receive data, to process the data and to return the data.

The term triple buffering is also known to a person skilled in the art from the production of graphics cards. In this connection, the provision of three memories is intended. In this case, one memory keeps the currently displayed image ready in an interval of time, and a second memory keeps the image for the next interval of time ready in this interval of time. A third memory receives the image for the interval of time after next in this interval of time. This makes it possible to always change the image data to be displayed during the return phase of the light beam in order to thus be able to reproduce a judder-free image. In contrast to the method according to the invention, this is not a bidirectional method.

In the triple buffering method according to the invention, each memory area performs three tasks in respectively different intervals of time. Each memory area is used to send, process and transfer data. In a double buffering method, as is known from the prior art, a memory area performs two tasks. Memory areas are used to receive data and to process the data. Other memory areas are used to process the data and to transfer data.

In other words, the present invention relates to a method for processing data. A data block to be processed is written to a memory area A, B, C in a first interval of time t1, t2, t3, .... The data block is processed in the same memory area A, B, C in a second interval of time t2, t3, t4, .... The processed data block is returned from the same memory area A, B, C in a third interval of time t3, t4, t5, ....

Figure 3:
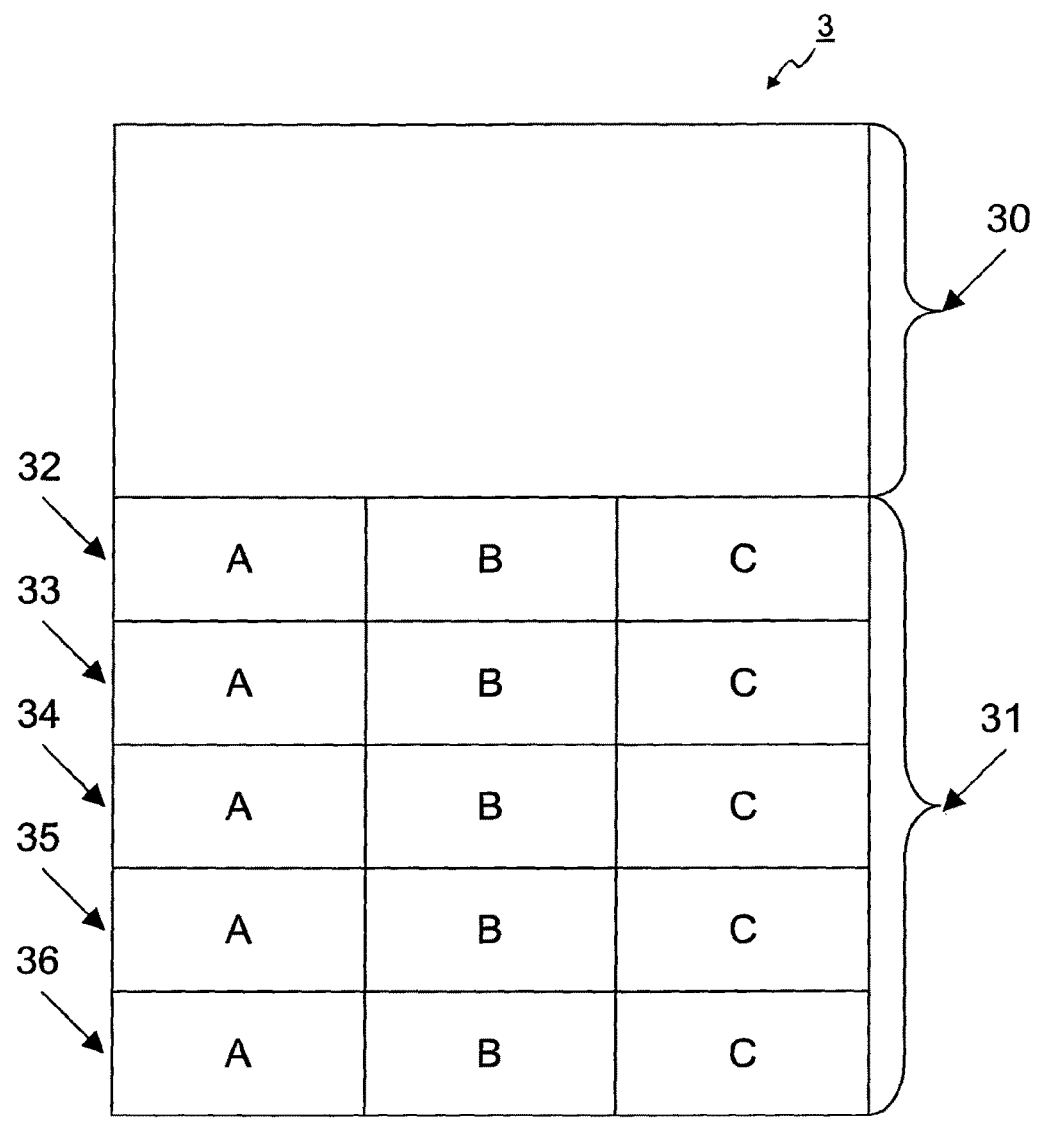
FIG. 3 shows the assignment of memory areas of a memory in accordance with the method according to the invention.

FIG. 3 diagrammatically shows the subdivision of a memory 3 of a target system 2. One part 31 of the memory 3 is used for bidirectional data transmission between the target system 2 and a first data processing system, and another part 30 of the memory 3 is used for other tasks. The memory area 31 which is used for bidirectional data transmission is subdivided into groups 32, 33, 34, ... of memory areas A, B, C. Each group 32, 33, 34, ... comprises three memory areas A, B, C which are of the same size and are used to carry out the method according to the invention. This subdivision makes it possible to simultaneously carry out a plurality of bidirectional data transmission operations in accordance with the method according to the invention, one or more groups 32, 33, 34, ... of memory areas A, B, C being respectively used for said data transmission operations. A plurality of groups 32, 33, 34, ... of memory areas A, B, C can be combined for a bidirectional data transmission operation. The capacity of the memory which is respectively available to receive data, to process data and to return the data for this bidirectional data transmission operation is increased according to the number of groups 32, 33, 34, ... of memory areas A, B, C used for this data transmission operation.

What is claimed is:

1. Method for processing data in one or more groups of memory areas, wherein each group comprises first, second and third memory areas, the method comprising:
    writing a first data block to the first memory area of a group in a first interval of time,
    processing the first data block in the first memory area of the group and writing a second data block to the second memory area of the group in a second interval of time, and
    transferring the processed first data block from the first memory area of the group, processing the second data block in the second memory area of the group, and writing a third data block to the third memory area of the group in a third interval of time, such that
    one memory area in the group of memory areas is respectively used to receive, process and transfer data in each interval of time.

2. Method according to claim 1, wherein the processing comprises image processing.

3. Method according to claim 1, wherein data in memory areas which have already been processed is overwritten.

4. Method according to claim 1, wherein the data blocks are received from a first data processing system and are processed in a second data processing system, and the processed data blocks are returned to the first data processing system, wherein the second data processing system comprises the one or more groups of memory areas.

5. Method according to claim 4, wherein the second data processing system is a subsystem of the first data processing system.

6. Method according to claim 4, wherein the first data processing system is a central processing unit and the second data processing system is a coprocessor.

7. Method according to claim 1, wherein the first data processing system is a PowerPC processor element and the second data processing system is a synergistic processor element.

8. Data processing system comprising one or more groups of memory areas, wherein each group comprises first, second and third memory areas, the system is adapted to:
    receive a first data block to the first memory area of a group in a first interval of time,
    process the first data block in the first memory area of the group and write a second data block to the second memory area of the group in a second interval of time, and
    transfer the processed first data block from the first memory area of the group, process the second data block in the second memory area of the group, and write a third data block to the third memory area of the group in a third interval of time, such that one memory area in the group of memory areas is respectively used to receive, process and transfer data in each interval of time.

9. Method for processing data, comprising:
    writing a data block to be processed
        being written to a memory area in a first interval of time, and
        processing the data block in the memory area in a second interval of time,
        transferring the processed data block from the memory area in a third interval of time, wherein data in memory areas which have already been processed is overwritten.

10. Method according to claim 9, wherein three memory areas in the memory are grouped to form a group of memory areas.

11. Method according to claim 10, wherein
    one or more groups of memory areas are used for the method, and
    one memory area in a group of memory areas is respectively used to receive, process and transfer data in each interval of time.

12. Method according to claim 9, wherein the processing comprises image processing.

13. Method according to claim 9, wherein the data blocks are received from a first data processing system and are processed in a second data processing system, and the processed data blocks are returned to the first data processing system.

14. Method according to claim 13, wherein the second data processing system is a subsystem of the first data processing system.

15. Method according to claim 13, wherein the first data processing system is a central processing unit and the second data processing system is a coprocessor.

16. Method according to claim 13, wherein the first data processing system is a PowerPC processor element and the second data processing system is a synergistic processor element.

* * * * *